(12) United States Patent
Newman

(10) Patent No.: US 9,432,187 B2
(45) Date of Patent: Aug. 30, 2016

(54) DATA SCRAMBLING INITIALIZATION

(71) Applicant: LSI Corporation, San Jose, CA (US)

(72) Inventor: Harvey J Newman, Scotts Valley, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 155 days.

(21) Appl. No.: 14/267,653

(22) Filed: May 1, 2014

(65) Prior Publication Data

US 2015/0312037 A1 Oct. 29, 2015

Related U.S. Application Data

(60) Provisional application No. 61/983,736, filed on Apr. 24, 2014.

(51) Int. Cl.
| | |
|---|---|
| *H04L 7/00* | (2006.01) |
| *H04L 9/08* | (2006.01) |
| *G09C 1/00* | (2006.01) |
| *H04L 9/06* | (2006.01) |
| *H04L 9/12* | (2006.01) |

(52) U.S. Cl.
CPC ............. *H04L 9/0869* (2013.01); *G09C 1/00* (2013.01); *H04L 9/065* (2013.01); *H04L 9/12* (2013.01); *H04L 2209/34* (2013.01)

(58) Field of Classification Search
CPC . G06F 13/42; G06F 13/4221; H04L 9/0869; H04L 2209/34; H04L 9/065; H04L 9/12; H04L 7/0004; H04L 7/0091; G09C 1/00
USPC .................................................. 375/367
See application file for complete search history.

(56) References Cited

U.S. PATENT DOCUMENTS

| | | | |
|---|---|---|---|
| 5,809,093 | A | 9/1998 | Cooper |
| 6,628,725 | B1 | 9/2003 | Adam et al. |
| 7,274,315 | B2 | 9/2007 | Baumer |
| 7,317,735 | B1 | 1/2008 | Ojard |
| 7,649,855 | B1 | 1/2010 | Lo et al. |
| 7,724,903 | B1 | 5/2010 | Kryzak et al. |

(Continued)

FOREIGN PATENT DOCUMENTS

WO 0225869 3/2002

OTHER PUBLICATIONS

SAS-4 / SPL-4 Block encoding discussion topics, retrieved from http://www.t10.org/cgi-bin/ac.pl?t=d&f=13-232r2.pdf Nov. 2013.

(Continued)

*Primary Examiner* — David B. Lugo

(57) ABSTRACT

Systems and methods for improved synchronization between a transmit device and a receive device in a communication system. In one embodiment, an apparatus for transmitting bits of data over a link includes a scrambler to scramble data and circuitry configured to insert the scrambled data into frames and to transmit the frames in data blocks over the link. The apparatus also includes an initialization module configured to generate an unscrambled pseudo-random sequence. The circuitry is further configured to periodically insert the unscrambled pseudo-random sequence into a frame, to initialize the scrambler to a starting point based on the insertion of the unscrambled pseudo-random sequence into the frame, and to transmit the frame in a data block over the link.

20 Claims, 8 Drawing Sheets

(56) References Cited

U.S. PATENT DOCUMENTS

| | | | |
|---|---|---|---|
| 7,738,502 | B2 | 6/2010 | Chang et al. |
| 7,747,796 | B1 | 6/2010 | Kumar et al. |
| 8,032,674 | B2 | 10/2011 | Nguyen et al. |
| 8,261,159 | B1 | 9/2012 | Sommer et al. |
| 2001/0055311 | A1* | 12/2001 | Trachewsky et al. ........ 370/445 |
| 2007/0239812 | A1 | 10/2007 | Lablans |
| 2010/0157884 | A1* | 6/2010 | Haga .................... H04J 11/0069 370/328 |
| 2010/0287402 | A1* | 11/2010 | Kim et al. .................... 713/400 |
| 2011/0149929 | A1* | 6/2011 | Kleider ................ H04L 5/0023 370/338 |
| 2012/0163490 | A1 | 6/2012 | Whitby-Strevens |
| 2012/0237036 | A1 | 9/2012 | Dabak et al. |
| 2013/0185466 | A1 | 7/2013 | Voorhees et al. |

OTHER PUBLICATIONS

SPL-4 Packet utilization and primitive encoding, retrieved from http://www.t10.org/cgi-bin/ac.pl?t=d&f=14-109r1.pdf Apr. 15, 2014.

SPL-4 Summary Proposal, retrieved from http://www.t10.org/cgi-bin/ac.pl?t=d&f=14-082r0.pdf Mar. 10, 2014.

SAS-4/SPL-4 Modeling, retrieved from http://www.t10.org/cgi-bin/ac.pl?t=d&f=14-081r0.pdf Mar. 10, 2014.

SPL-4: Block Encoding Observations, retrieved from http://www.t10.org/cgi-bin/ac.pl?t=d&f=13-285r0.pdf Nov. 5, 2013.

SPL-4: Scrambling Methodology, retrieved from http://www.t10.org/cgi-bin/ac.pl?t=d&f=13-280r1.pdf Mar. 10, 2014.

SPL-4 G5 block format, retrieved from http://www.t10.org/cgi-bin/ac.pl?t=d&f=13-268r1.pdf Nov. 1, 2013.

* cited by examiner

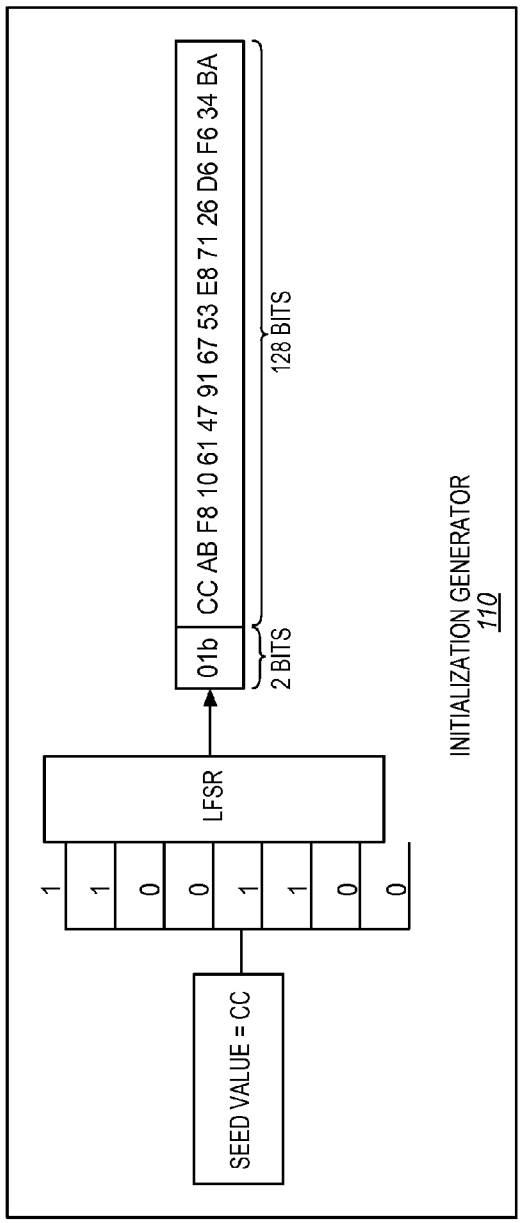
*FIG. 7*
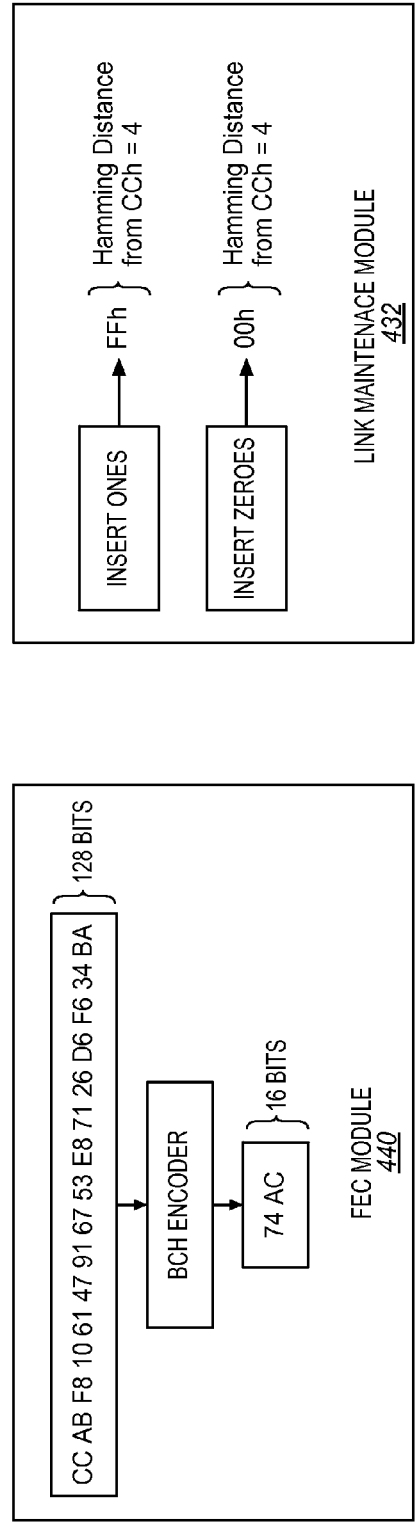
*FIG. 9*
*FIG. 8*

DATA SCRAMBLING INITIALIZATION

This document claims priority to, and thus the benefit of an earlier filling date from, U.S. Provisional Application No. 61/983,736 (filed on Apr. 24, 2014) entitled "DATA SCRAMBLING INITIALIZATION", which is hereby incorporated by reference.

FIELD OF THE INVENTION

The invention relates to data scrambling initialization in linked devices.

BACKGROUND

Several high speed serial communication protocols such as Serial Attached Small Computer System Interface (SAS), USB, IEEE 1394, Fibre Channel, etc., use coding schemes to balance edge transitions and edge density in a stream of data. For example, several protocols, including SAS, use the popular 8b10b coding scheme, where 10-bit symbols represent 8-bit blocks of data and the extra bits in the transmitted 10-bit symbols are selected to balance the average of ones and zeroes transmitted over the link. This concept, known as Direct Current (DC) balance, improves bandwidth characteristics of the signal. The coding scheme also ensures a sufficient rate of transitions between one and zero on the line, enabling a receiver circuit to accurately recover bits in the stream at relatively high transmission rates.

Future updates to the SAS protocol seek to improve overall throughput. Due to the relatively high 20% overhead associated with the 8b/10b coding scheme, more efficient coding schemes that improve efficiency and data throughput are sought. However, it remains a design challenge to update communication protocols with new coding schemes while maintaining backwards compatibility with legacy devices. Moreover, more efficient coding schemes typically include longer run lengths that make it difficult to maintain and sufficient transition density on the transmission line and DC balance. Current protocols also lack advanced Serializer/Deserializer (SerDes) features such as continuous adaptation on the link and full randomization of the bit stream.

SUMMARY

Systems and methods presented herein provide for data scrambling initialization in a communication system. In one embodiment, an apparatus for transmitting bits of data over a link includes a scrambler to scramble data and circuitry configured to insert the scrambled data into frames and to transmit the frames in data blocks over the link. The apparatus also includes an initialization module configured to generate an unscrambled pseudo-random sequence. The circuitry is further configured to periodically insert the unscrambled pseudo-random sequence into a frame, to initialize the scrambler to a starting point based on the insertion of the unscrambled pseudo-random sequence into the frame, and to transmit the frame in a data block over the link.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

FIGS. 7-9 are block diagrams of exemplary modules of a transmitter device.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
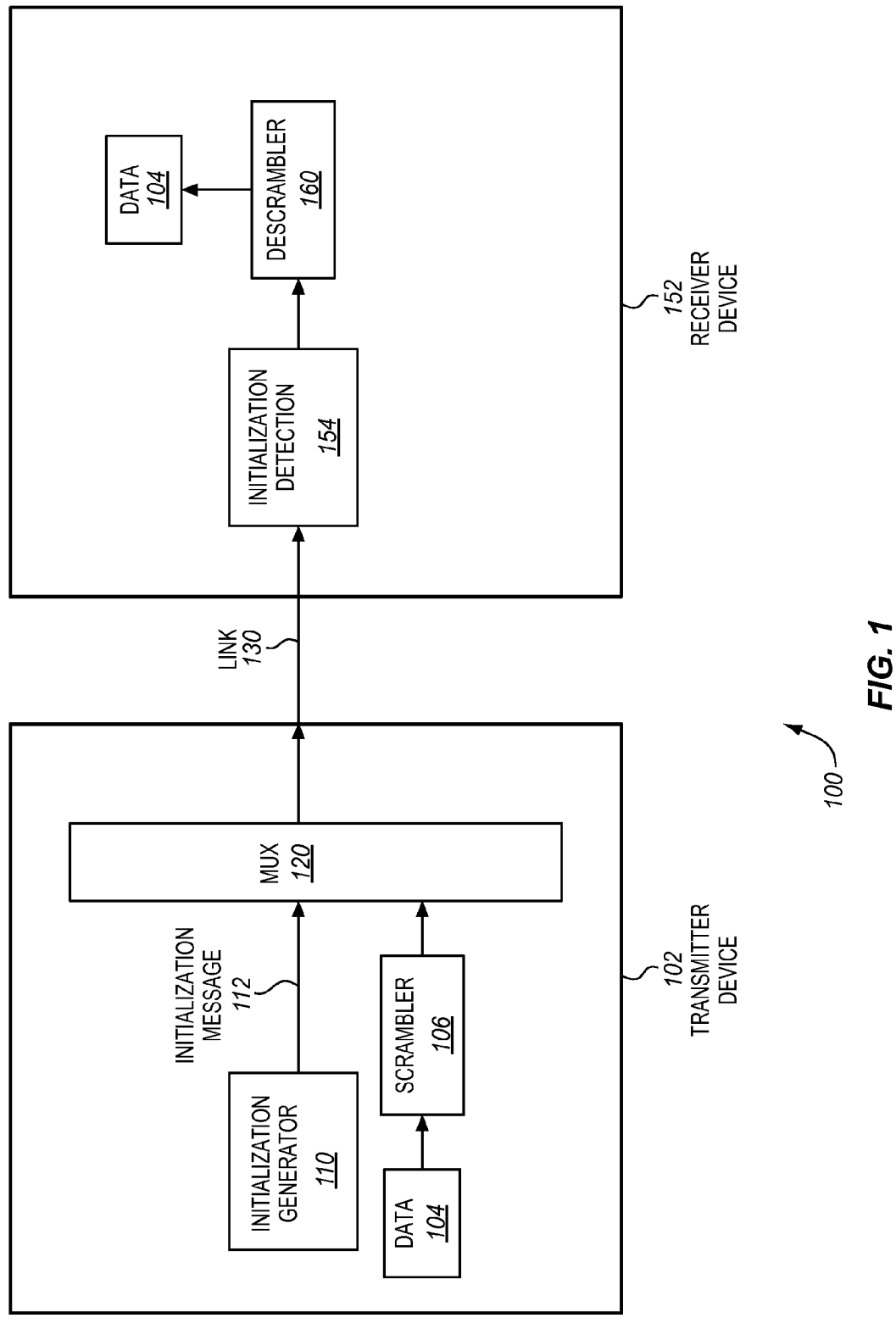
FIG. 1 is a block diagram of a communication system in an exemplary embodiment.

FIG. 1 is a block diagram of a communication system 100 in an exemplary embodiment. The communication system 100 includes a transmitter device 102 and a receiver device 152, sometimes referred to as nodes, for exchanging data over a link 130. Examples of nodes include a server or host; a client or storage device; a hub, switch, or router; all or a portion of a Storage Area Network (SAN) fabric; etc. Generally speaking, a node includes a physical coding sublayer (PCS), sometimes referred to as a phy layer, which includes components for configuring and detecting units of data in accordance with a desired communications architecture.

The transmitter device 102 includes phy components that prepare bits of information for transmission to the receiver device 152 over the link 130. Data 104 is passed down from upper layers of a supported architecture in the transmitter device 102. The scrambler 106 improves signal characteristics by eliminating repetitive bit patterns in the data 104 that may cause loss of synchronization at the receiver device 152. In one embodiment, the scrambler 106 includes a linear feedback shift register (LFSR) that generates a cyclical sequence of pseudo-random bits from a predefined initial state. The pseudo-random sequence output by the scrambler 106 may be exclusive-OR'd with the data 104 to generate scrambled data.

The receiver device 152 recovers the data 104 in its original unscrambled form with a descrambler 160. In one embodiment, the descrambler 160 includes an LFSR configured with a corresponding cyclical sequence and predefined initial state with respect to the LFSR of the transmitter device 102. When the scrambler 106 and the descrambler 160 are initialized properly, the transmitter device 102 is able to transmit the data 104 with beneficial signal characteristics and the receiver device 152 is able to receive the data 104 accurately. With the data 104 unscrambled, it may be passed along to upper layers of a supported architecture of the receiver device 152.

The transmitter device 102 and the receiver device 152 are enhanced with initialization generator 110 and initialization detection 154, respectively, to generate/detect an initialization message 112. The initialization message 112 is a pseudo-random sequence that operates as a frame alignment pattern for communication between the transmitter device 102 and the receiver device 152. The initialization generator 110 and the initialization detection 154 initialize the scrambler 106 and descrambler 160, respectively, to predefined starting points based on transmission of the initialization message 112 over the link 130 at regular intervals. The initialization message 112 therefore synchronizes the transmitter device 102 and the receiver device 152 without a retraining window or handshake sequence.

Coordination between the scrambler 106 and the descrambler 160 allows full randomization of bits over the link 130 which in turn enables continuous adaptation of the receiver device 152. Moreover, the pseudo-random nature of the initialization message 112, when property designed, is distinguishable from other data patterns which reduces the chance of synchronization errors at the receiver device 152 and facilitates compatibility with existing communication architectures. Pseudo-random patterns also have benign analog characteristics (e.g., transitions, DC balance, spectral balance) and may be generated/detected with relatively simple circuitry. Further details and operation of the initialization message 112 will be described in embodiments to follow.

Figure 2:
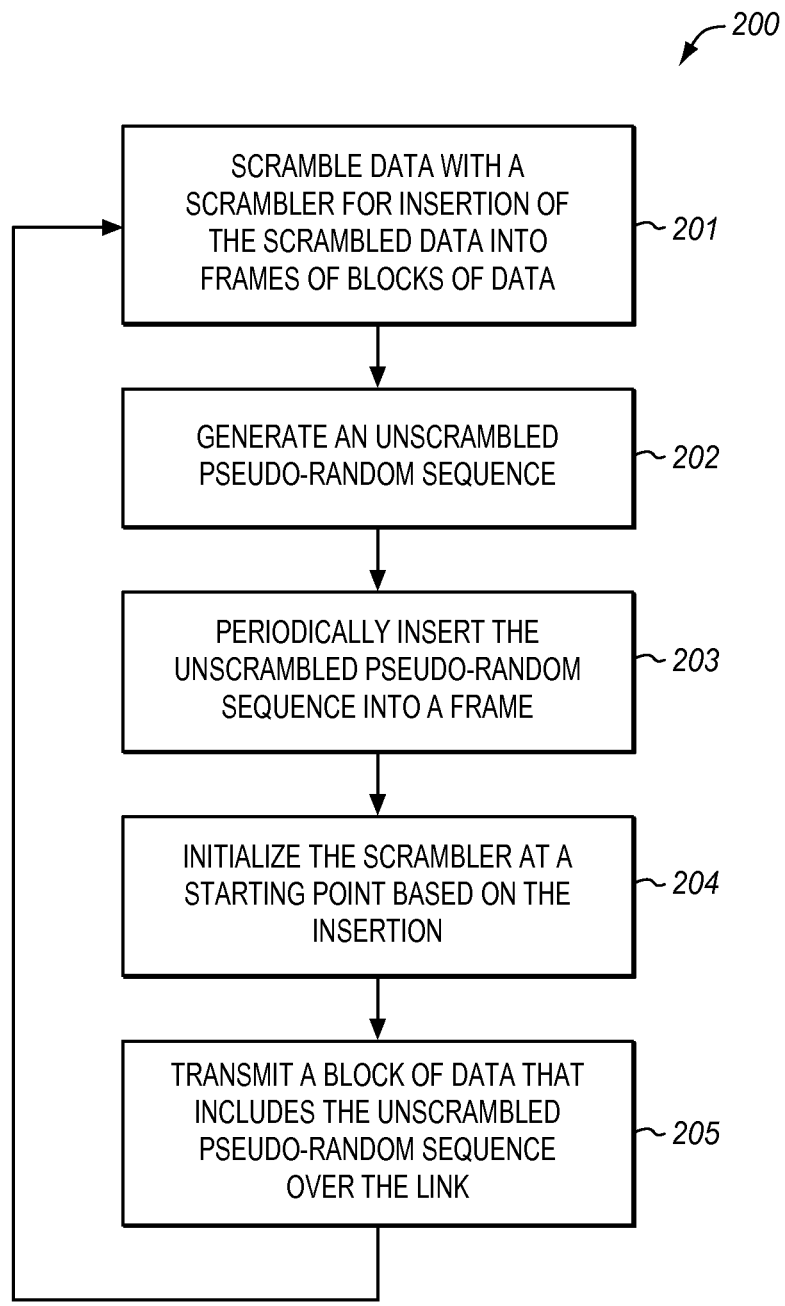
FIG. 2 is a flowchart illustrating a method for preparing data blocks for transmission with a transmitter device in an exemplary embodiment.

FIG. 2 is a flowchart illustrating a method 200 for preparing data blocks for transmission with a transmitter device in an exemplary embodiment. The steps of method 200 are described with reference to the transmitter device 102 of FIG. 1, but those of ordinary skill in the art will appreciate that the method 200 may be performed in other systems. Moreover, steps in each of the flowcharts described herein are not all inclusive and may include other steps not shown. The steps of each flowchart described herein may also be performed in alternative orders. Assume, for the sake of this embodiment, that the transmitter device 102 is in communication with a receiver device and bits of information are exchanged in accordance with a common data structure.

In step 201, the scrambler 106 scrambles data 104 for insertion of scrambled data into frames of data blocks. The data blocks which include the scrambled data are transmitted over the link 130 to the receiver device 152. In step 202, the initialization generator 110 generates an unscrambled pseudo-random sequence (i.e., initialization message 112). The transmitter device 102 periodically inserts the unscrambled pseudo-random sequence into a frame in step 203. In step 204, the transmitter device 102 initializes the scrambler 106 to a starting point based on the insertion of the unscrambled pseudo-random sequence. Then, the transmitter device 100 transmits a block of data that includes the pseudo-random sequence over the link 130 in step 205. Thus, the transmitter device 102 selects the unscrambled pseudo-random sequence for insertion/transmission at a regular interval (e.g., every 100 μs) and selects/inserts/transmits scrambled data from the scrambler 106 in between the intervals. The method 200 may then repeat the process with the next frame/block as shown in FIG. 2.

Figure 3:
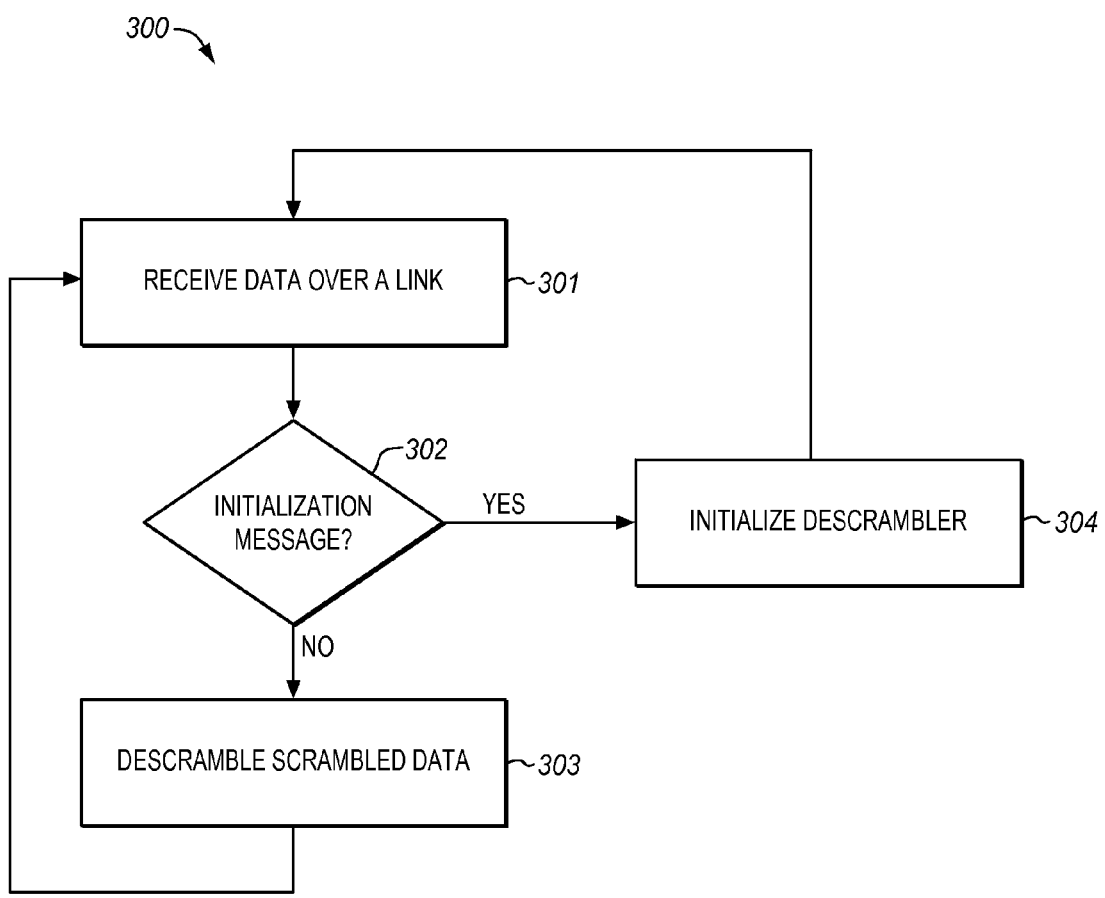
FIG. 3 is a flowchart illustrating a method for receiving data blocks with a receiver device in an exemplary embodiment.

FIG. 3 is a flowchart illustrating a method 300 for receiving data blocks with a receiver device in an exemplary embodiment. The steps of the methods herein are described with reference to the receiver device 152 of FIG. 1, but those of ordinary skill in the art will appreciate that the methods may be performed in other systems. Assume, for the sake of this embodiment, that the receiver device 152 is in communication with a transmitter device and bits of information are exchanged in accordance with a common data structure.

In step 301, the receiver device 152 receives data over the link 130. The receiver device 152 determines whether the received data is the unscrambled pseudo-random sequence (i.e., initialization message 112) or whether the received data is scrambled data in step 302. The initialization detection module 154 of the receiver device 152 may detect the unscrambled pseudo-random sequence with an LFSR with a similar configuration to the LFSR in a transmitter device that generated the unscrambled pseudo-random sequence. When the unscrambled pseudo-random sequence is detected, the method proceeds to step 304, and the receiver device 152 initializes the descrambler 160 to a starting point. Otherwise, if data received over the link 130 is scrambled, the receiver device 152 descrambles the scrambled data with the descrambler 160 in step 303. The method 300 may then repeat the process with the next frame/block as shown in FIG. 3.

The synchronized periodic initialization of the scrambler 106 and the descrambler 160 to their respective starting points allows continuous adaptation over the link 130. In previous protocols, the nodes resynchronize with retraining and handshake sequences. The unscrambled pseudo-random sequence provides good spectral content over the link 130 and is easily generated and detected with simple circuitry. Moreover, as will be discussed further herein, the unscrambled pseudo-random sequence may be used to upgrade nodes to a more efficient coding scheme (e.g., 128b/130b) while maintaining backward compatibility with earlier protocols and coding schemes (e.g., 8b/10b).

Figure 4:
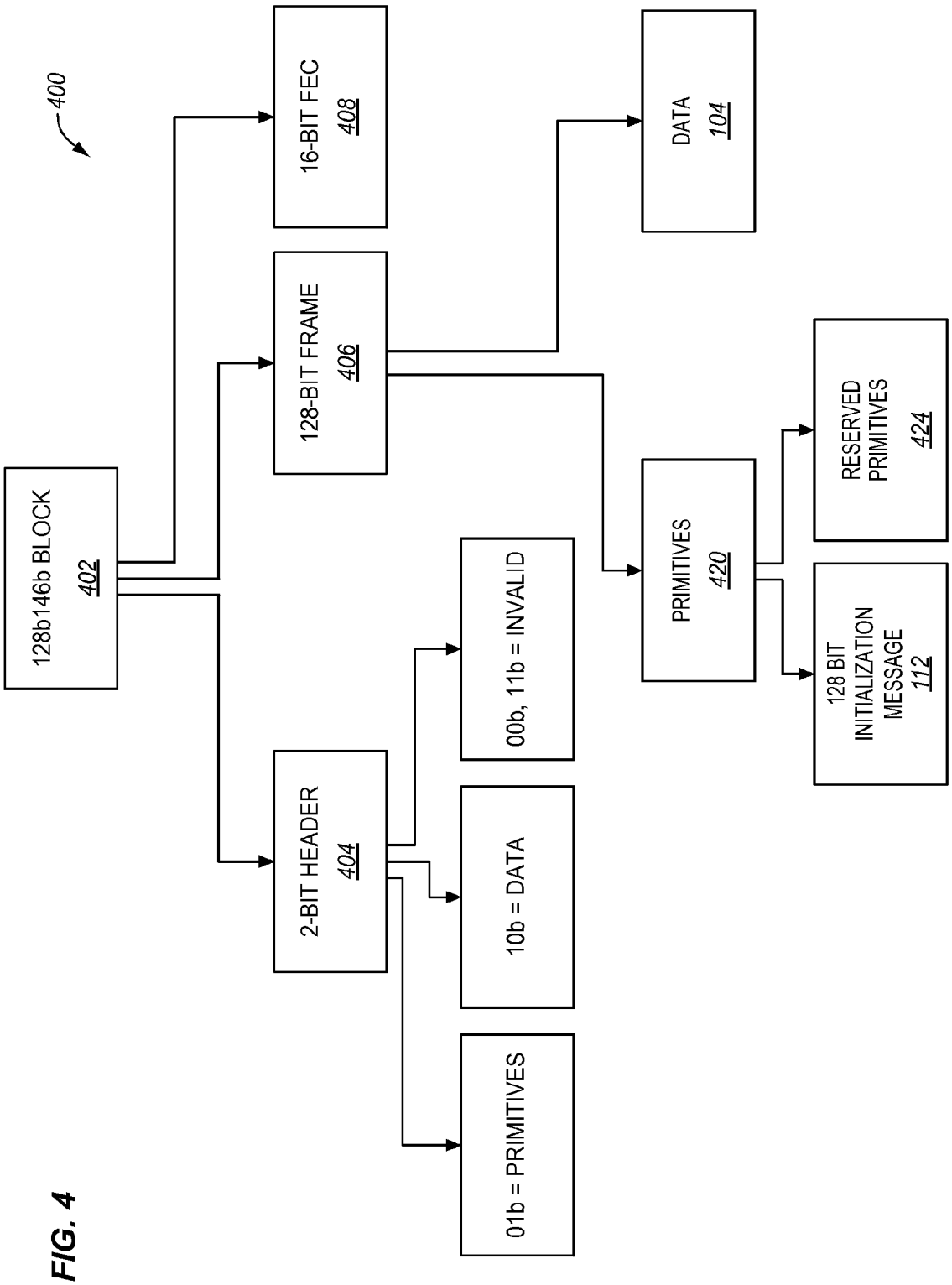
FIG. 4 is a block diagram of an exemplary data structure.

FIG. 4 is a block diagram of an exemplary data structure 400. In this example, data block 402 includes a 2-bit header 404, a 128-bit frame 406, and a 16-bit forward error correction (FEC) field 408 for a total of 146 bits in the data block 402, referred to as a 128b/146b coding scheme. The header 404 indicates whether the subsequent frame 406 is a primitive 420 or data 104. Invalid header values (e.g., 00b and 11b) may be used to detect loss of synchronization.

Primitives (i.e., reserved primitives 424) are used in legacy Serial Attached Small Computer System Interface (SAS) devices. The SAS standard provides commands, transport protocols, and interfaces for physically connecting and exchanging data between SAS devices. For example, in SAS, a frame consists of groups of four bytes called dwords, and a dword may represent data or primitives as defined in the SAS protocol. Primitives typically begin with a special 10-bit character (e.g., K28.5, K28.3, etc.) and are used for a variety of signaling and handshaking functions. Data dwords (i.e., data 104) in SAS carry data, commands, and configuration information.

While the discussion herein refers to primitives and SAS embodiments, those of ordinary skill in the art will recognize that the data structure 400 of FIG. 4 is exemplary and provided for purposes of explanation. Features discussed herein may be equally applicable in other systems and protocols, such as Serial Advanced Technology Attachment (SATA), USB, IEEE 1394, Fibre Channel, and other high speed serial applications. As such, embodiments herein may communicate bits of data via blocks, frames, packets, primitives, or any other data transmission format known in the art.

Figure 5:
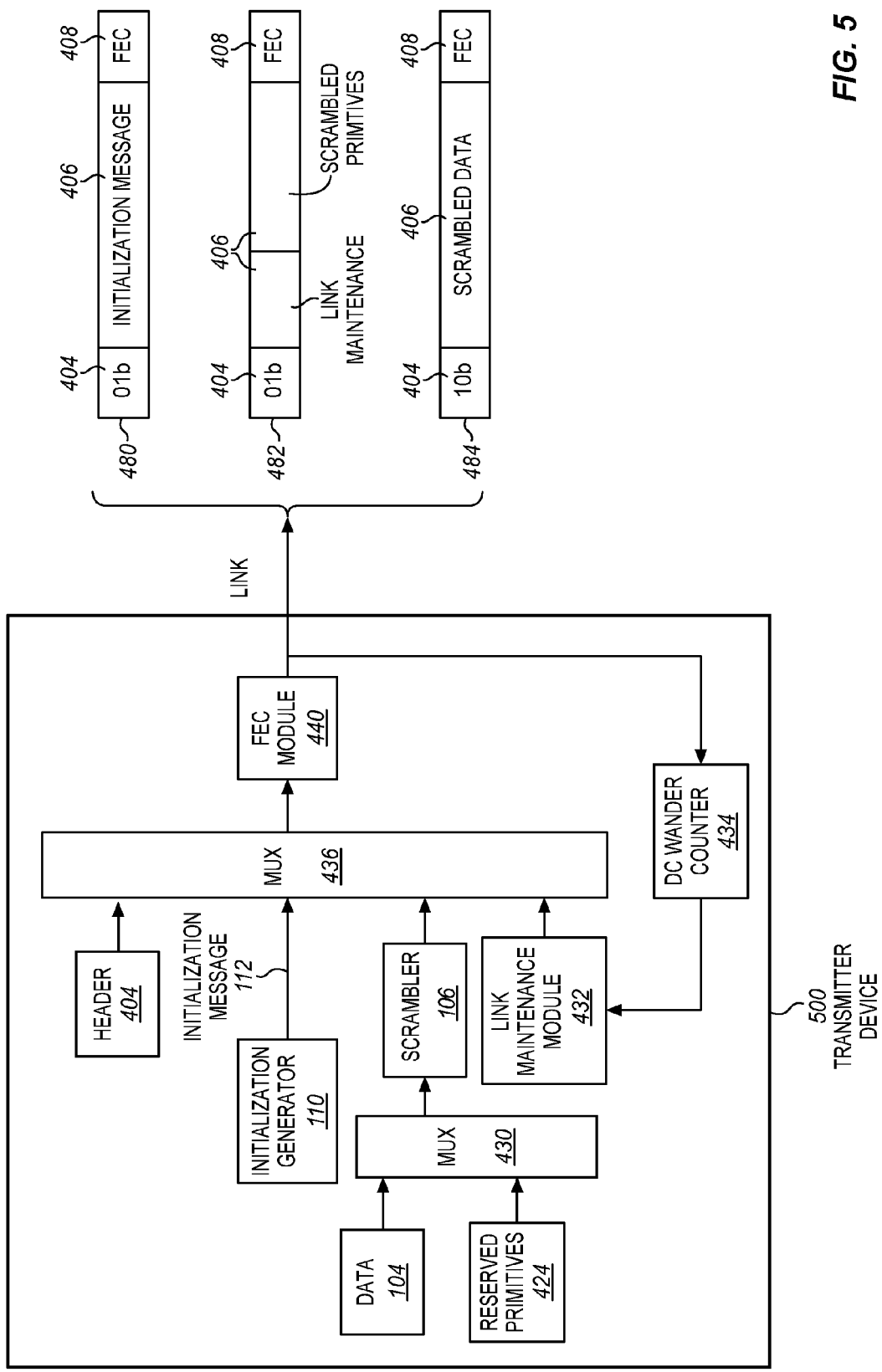
FIG. 5 is a block diagram of an exemplary transmitter device operable to prepare data blocks in accordance with the exemplary data structure.

FIG. 5 is a block diagram of an exemplary transmitter device 500 operable to prepare data blocks in accordance with data structure 400. In one embodiment, the phy layer of the transmitter device 500 is compliant with the SAS Protocol Layer (SPL). As such, data 104 may include an address frame, a Serial SCSI Protocol (SSP) frame, a Serial Management Protocol (SMP) frame, or a Serial ATA Tunneling Protocol (STP) frame passed down from the link layer of the transmitter device 500. Reserved primitives 424 may include legacy SAS 40-bit primitives encoded with an 8b/10b coding scheme in the link layer of the transmitter device 500.

The data structure 400 allows the transmitter device 500 to define additional primitives not defined in legacy SAS. One such primitive 420 is initialization message 112 that is useful for communication synchronization between two nodes. In this example, the initialization message 112 is 128 bits in length to fit within a single frame 406 of a data block 402 as defined by the data structure 400. While data structure 400 depicts a specific number of bits, those of ordinary skill will recognize that alternative formats are possible including other sizes, types, and/or configurations including formats from any other suitable protocols.

In this embodiment, the transmitter device 500 attaches 16 forward error correction bits to data block 402 with FEC module 440. The transmitter device 500 also includes DC wander counter 434 and link maintenance module 432 to balance the number of ones and zeroes transmitted over the link 130. Those of ordinary skill in the art will recognize that components of the transmitter device 500 may be included as a matter of design choice and that alternative arrangement and formats are possible. Moreover, the transmitter device 500 may include additional components not shown such as, for example, a parallel-to-serial converter and/or a differential encoder. Further details and operation of the transmitter device 500 with respect to data structure 400 will be described in embodiments to follow.

Figure 6:
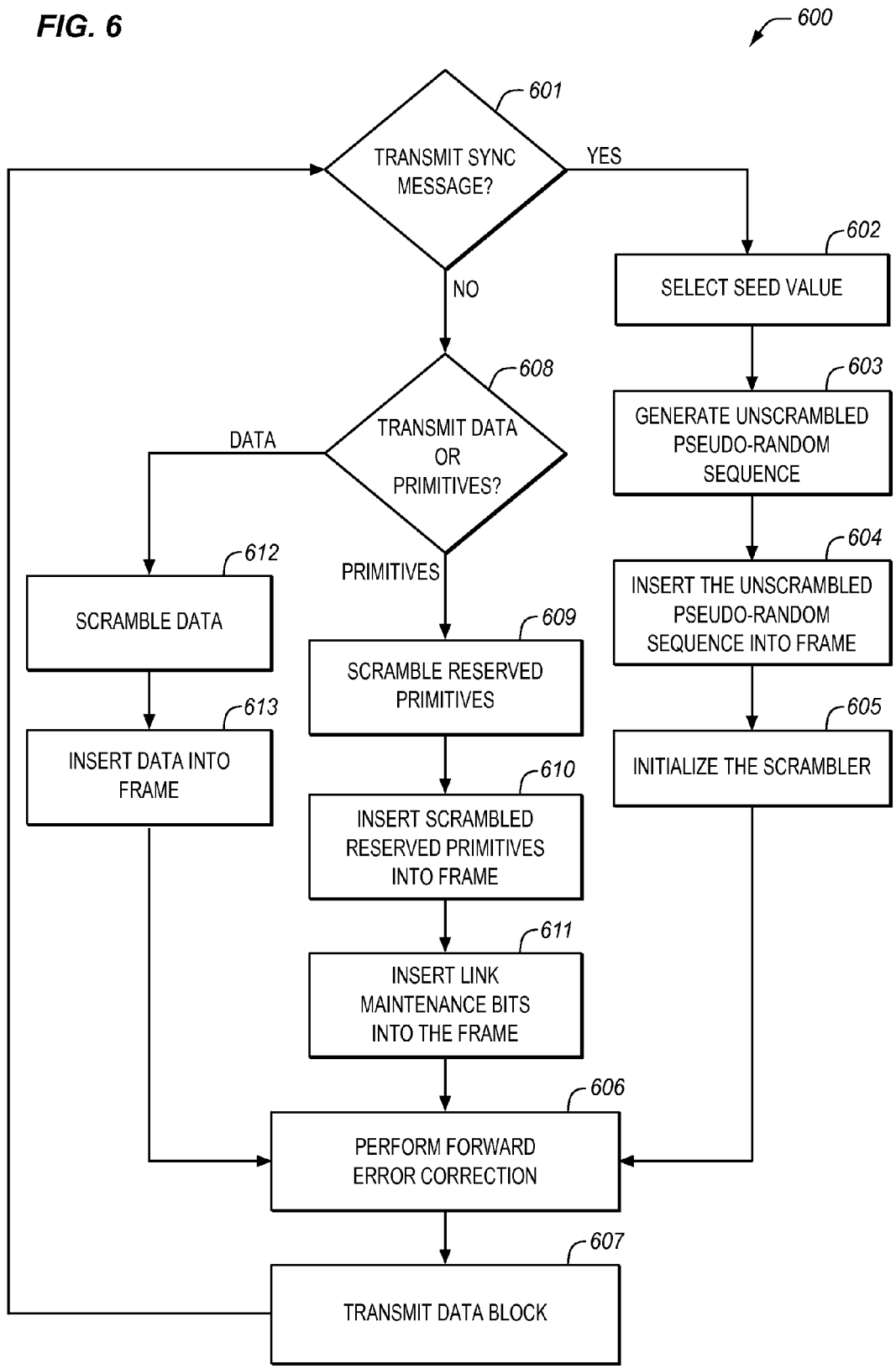
FIG. 6 is a flowchart illustrating a method for preparing data blocks for transmission with a transmitter device in an exemplary embodiment.

FIG. 6 is a flowchart illustrating a method 600 for preparing blocks of data for transmission with a transmitter device in an exemplary embodiment. The steps of the methods herein are described with reference to the transmitter device 500 and data structure 400, but those of ordinary skill in the art will appreciate that the methods may be performed in other systems. Steps described herein may be performed in alternative orders and may include additional steps not shown. Assume, for the sake of this embodiment, that the transmitter device 500 is in communication with a receiver device.

In step 601, the transmitter device 500 determines whether or not to transmit initialization message 112. In that regard, the transmitter device 500 may include timing circuitry (not shown) configured to insert/transmit the initialization message 112 at regular intervals in a frame 406 of a data block 402. In some embodiments, the transmitter device 500 adds a dither to the regular interval for additional robustness.

When the transmitter device 500 determines to send the initialization message 112, the method 600 proceeds to step 602 where a seed value is selected for input to the initialization generator 110. To further illustrate, FIG. 7 is a block diagram of exemplary module of the transmitter device 500. In this example, the initialization generator 110 includes an LFSR that retrieves/receives a 7-bit seed value input. The LFSR is coupled with seven memory cell blocks that collectively store the first seven bits of an eight bit value. In the example shown, the memory cells store a seed value of CCh so that the first seven bits (i.e., 1100110) are input to the LFSR. The memory cells may be programmed to store alternative seed values as a matter of design choice.

In step 603, the initialization generator 110 generates an unscrambled pseudo-random sequence, also referred to herein as initialization message 112, based on the seed value input. Referring again to the example in FIG. 7, the LFSR of the initialization generator 110 generates the 128-bit value shown based on the seed value CCh. In some embodiments, the LFSR is configured to generate leading bits to be used as a header 404. For example, seed value CCh is programmed into the input of LFSR which outputs a leading 2-bit value of 01b followed by the 128-bit value shown based on that seed value. The 2-bit value 01b appropriately identifies the initialization message 112 as a primitive 420 (see e.g., FIG. 4), therefore the seed value CCh advantageously generates a header 404 and a frame 406 with simple circuitry (i.e., seven memory cells and an LFSR). In some embodiments, the last bit (e.g., $128^{th}$ bit) in the unscrambled pseudo-random sequence is cleared to zero in order to maintain DC balance. Therefore, the initialization generator 110, in some embodiments, is configured to generate a repeating 127-bit sequence based on a 7-bit seed value input.

In step 604, the transmitter device 500 inserts the unscrambled pseudo-random sequence into a frame 406 of a data block 402. The LFSR of the initialization generator 110 may be configured to generate the initialization message 112 to match or otherwise fit within the length of a single frame (e.g., frame 406) of a supported architecture (e.g., data structure 400). In step 605, the scrambler 106 is initialized to a starting point in response to insertion of the unscrambled pseudo-random sequence into the frame 406. In step 606, the transmitter device 500 performs forward error correction on the block of data 102. The data block 402 is then transmitted over the link 130 in step 607. Data block 480 of FIG. 5 illustrates an exemplary transmitted data block as a result of steps 602-607.

The FEC module 440 implements an algorithm to minimize transmission errors. Examples of algorithms used for FEC include convolutional codes, Hamming codes, Reed-Solomon codes, and Bose-Chaudhuri-Hocquenghem (BCH) codes. Here, data structure 400 allows for 16 bits of forward error correction in each transmitted data block 402. To further illustrate, the exemplary module of FIG. 8 shows FEC module 440 that includes a BCH encoder that appends 16 FEC bits to a data block 402 based on content in the frame 406 (e.g., initialization message 112). In this example, the FEC module 440 produces value 74h ACh based on the initialization message 112 generated with seed value CCh. Therefore, in embodiments with forward error correction, a seed value may be selected such that the resultant 128-bit initialization message 112 and 16-bit FEC have a combined minimal disparity between the total number of ones and the total number of zeroes to promote DC balance over the link 130. In embodiments without forward error correction, a seed value may be selected such that the initialization message 112 itself is DC balanced.

In between the regular intervals, the transmitter device 500 determines not to transmit the initialization message 112 and the method 600 proceeds to step 608. In step 608, the transmitter device 500 determines whether to transmit data 104 or reserved primitives 424. In this embodiment, since a frame 406 is 128 bits in length, the transmitter device 500 is configured to send up to three reserved primitives 424 (each 40-bits in length) in a single frame for a total of 120 bits.

Therefore, when a sufficient number of primitives (e.g., three) are passed down from upper layers of a protocol, the transmitter device 500 determines to transmit primitives and the method 600 proceeds to step 609.

In step 609 the scrambler 106 scrambles the reserved primitives 424. It should be noted that legacy SAS does not scramble these primitives because legacy SAS uses unscrambled primitives for rate matching. However, rate matching is no longer necessary with a regularly transmitted initialization message 112, and scrambling reserved primitives 424 (in addition to scrambling date 104) advantageously allows for continuous adaptation of linear equalizers and decision feedback equalizers (DFEs). Thus, the transmitter device 500 enables continuous adaptation over the link 130 while remaining compatible with legacy control commands (e.g., reserved primitives 424).

In step 610, the transmitter device 500 inserts the scrambled reserved primitives 424 into a frame 406. In step 611, the transmitter device 500 inserts link maintenance bits into the frame 406 alongside the scrambled reserved primitives 424. As discussed above, in the exemplary embodiment, three 40-bit reserved primitives 424 are scrambled and inserted into a frame 406. The transmitter device 500 is configured to include 8 bits of link maintenance from the link maintenance module 432 to fill the rest of the 128-bit frame 406. Link maintenance module 432 operates with DC wander counter 434 to balance the number of ones and zeroes transmitted over the link 130. The DC wander counter 434 tracks the disparity between the number of zeroes sent and the number of ones sent on the link 130. The link maintenance module 432 uses the disparity count to generate eight ones (i.e., FFh) or eight zeroes (i.e., 00h), whichever tends to balance the disparity.

The method 600 then proceeds to step 606 and forward error correction is performed in a manner similar to that described above. In step 607, the transmitter device 500 transmits the data block 402 over the link 130. Data block 482 of FIG. 5 illustrates an exemplary transmitted data block as a result of steps 609-611, 606, and 607. The method 600 may repeat as shown in FIG. 6. When the transmitter device 500 determines to transmit data 104 in step 608, the method 600 proceeds to steps 612, 613, 606, and 607 for steps similar to that already described. Data block 484 of FIG. 5 illustrates an exemplary transmitted data block as a result of these steps. Again, the method 600 may repeat as shown.

In the exemplary data structure 400 legacy control values (e.g., reserved primitives 424) and control values not defined in legacy protocols (e.g., initialization message 112) are identified by the same type of header 404 (e.g., 01b) for efficiency. In the illustrated example, unscrambled link maintenance bits may be inserted into frames alongside scrambled reserved primitives 424. It may therefore be desirable for corresponding portions of frames with different control values to have a minimal threshold hamming distance to reduce the probability that the two types of primitives 420 are mistaken for one another at a receiver device.

To illustrate, data block 480 includes a header 404 set to 01b and a frame 406 that includes initialization message 112, and data block 482 includes a header 404 set to 01b and a frame 406 that includes eight link maintenance bits followed by 120 bits of scrambled reserved primitives 424. The example in FIG. 7 shows that the LFSR of the initialization generator 110 produces a 128-bit initialization message 112 that includes a beginning portion (e.g., first eight bits) that matches the seed value used (e.g., CCh). To distinguish between the first portion of the 128-bit initialization value 112 and the link maintenance bits, a seed value is selected/programmed in the memory cells to produce an initialization message 112 whose beginning bits (e.g., CCh) are sufficiently unique from the link maintenance bits. The example link maintenance module 432 in FIG. 9 shows that the selected seed value CCh has hamming distances from DC balance symbols (FFh and 00h) of 4. Here, the transmitter device 500 is highly unlikely to produce four bit errors in the first eight bits of a transmitted frame 406, therefore the exemplary selected seed value CCh may be said to have sufficient hamming distance from the link maintenance bits.

Therefore, there are several possible considerations in selection of a seed value for the initialization generator 110 to use for generation of the initialization message 112. A seed value may be selected to produce an initialization message 112 along with leading bits that appropriate identify the initialization message 112 as a control value (e.g., primitive). A seed value may also be selected to produce an initialization message 112 that includes a portion with sufficient hamming distance from other types of data sent (e.g., link maintenance bits). And, a seed value may be selected to produce an initialization message 112 that interacts with a forward error correction algorithm such that the resulting forward error correction bits and initialization message have a combined even or small disparity of ones and zeroes.

The seed value may be selected/programmed in memory cells as a matter of design choice for optimal balance of the above-listed considerations. Experimental testing has shown that seed values CCh, A5h, and 4Fh provide a good balance of these characteristics for embodiments with 128-bit frames. However, optimal seed value selection may vary depending on the data structure and components of the nodes. For example, some protocols/devices may use different link maintenance bits than those described herein, may implement an alternative forward error correction algorithm, or may not implement these functions at all. Furthermore, principles described herein are equally applicable to alternative formats. For example, the devices described herein may implement a 64/66b coding scheme. In that case, it may be desirable for initialization generator 110 to include an LFSR that generates a 64-bit initialization message 112 based on a 4-bit seed value input, such that the initialization message 112 fits within a single frame of the supported data architecture.

Figure 10:
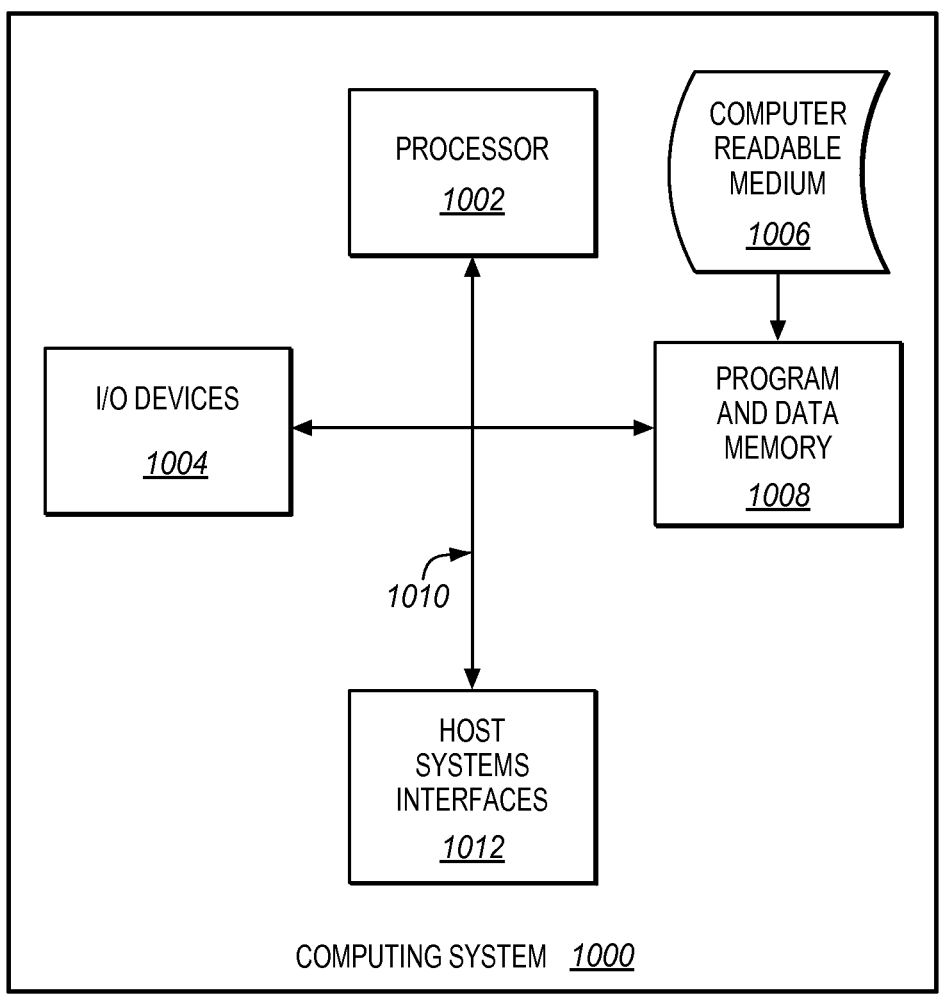
FIG. 10 is a block diagram of an exemplary computing system in which a computer readable medium provides instructions for performing methods herein.

Embodiments described herein may take the form of hardware, software, or some combination thereof. Embodiments implemented in software, may include, but are not limited to firmware, resident software, microcode, etc. FIG. 10 illustrates a computing system 1000 in which a computer readable medium 1006 provides instructions for performing any of the methods disclosed herein.

The medium 1006 can be any tangible electronic, magnetic, optical, electromagnetic, infrared, or semiconductor system (or apparatus or device). Examples of a computer readable medium 1006 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 1000, suitable for storing and/or executing program code, may include one or more processors 1002 coupled directly or indirectly to memory 1008 through a system bus 1010. The memory 1008 can include local memory employed during actual execution of the program code, bulk storage, and cache memories which provide temporary storage of at least some program code in order to reduce the number of times code is retrieved from bulk storage during execution. Input/output or I/O devices 1004 (including but not limited to keyboards, displays, pointing devices, etc.) can be coupled to the system either directly or through intervening I/O controllers. Network adapters may also be coupled to the system to enable the computing system 1000 to become coupled to other data processing systems, such as through host systems interfaces 1012, or remote printers or storage devices through intervening private or public networks. Modems, cable modem and Ethernet cards are just a few of the currently available types of network adapters.

What is claimed is:

1. An apparatus for transmitting bits of data over a link, comprising:
   a scrambler configured to scramble data;
   circuitry configured to insert the scrambled data into data frames of data blocks, and to transmit the data blocks over the link; and
   an initialization module configured to generate an unscrambled pseudo-random sequence;
   the circuitry further configured to insert the unscrambled pseudo-random sequence into a data frame instead of the scrambled data at a predefined periodic interval, to initialize the scrambler to a starting point based on the insertion of the unscrambled pseudo-random sequence into the data frame, and to transmit the data frame in a data block over the link; and
   the initialization module further configured to generate the unscrambled pseudo-random sequence based on a seed value selected so that a first portion of the unscrambled pseudo-random sequence represents a header of the data block that indicates that the data frame includes a second portion of the unscrambled pseudo-random sequence.

2. The apparatus of claim 1, further comprising:
   a link maintenance module configured to insert maintenance bits into frames to balance ones and zeroes transmitted on the link; and
   the seed value is selected to have a threshold hamming distance from the maintenance bits.

3. The apparatus of claim 1, further comprising:
   a forward error correction module configured to generate correction bits for the data frame that includes the unscrambled pseudo-random sequence, and to attach the correction bits to the data block that includes the data frame; and
   wherein the seed value is selected to produce a minimal threshold of disparity of total ones and zeroes between the unscrambled pseudo-random sequence and the correction bits.

4. The apparatus of claim 3, wherein:
   the forward error correction module generates correction bits based on a Bose-Chaudhuri-Hocquenghem (BCH) encoding algorithm.

5. The apparatus of claim 1, wherein:
   the initialization module includes a linear feedback shift register configured to generate the unscrambled pseudo-random sequence based on the seed value.

6. The apparatus of claim 1, wherein:
   the apparatus is compliant with Serial Attached Small Computer System Interface architecture;
   the circuitry is further configured to prepare first block types that include a header that indicates inclusion of control bits and a frame that includes scrambled primitives of the Serial Attached Small Computer System Interface architecture and unscrambled link maintenance bits;
   the circuitry is further configured to prepare second block types that include a header that indicates inclusion of control bits and a frame that includes the unscrambled pseudo-random sequence; and
   the seed value is selected to produce a threshold hamming distance between the unscrambled pseudo-random sequence and the unscrambled link maintenance bits to distinguish the first block types from the second block types.

7. A method comprising:
   scrambling data with a scrambler;
   inserting the scrambled data into data frames of data blocks;
   transmitting the data blocks over a link;
   generating an unscrambled pseudo-random sequence;
   inserting the unscrambled pseudo-random sequence into a data frame instead of the scrambled data at a predefined periodic interval;
   initializing the scrambler to a starting point based on the insertion of the unscrambled pseudo-random sequence into the data frame; and
   transmitting the data frame in a data block over the link;
   wherein the generating of the unscrambled pseudo-random sequence is based on a seed value selected so that a first portion of the unscrambled pseudo-random sequence represents a header of the data block that indicates that the data frame includes a second portion of the unscrambled pseudo-random sequence.

8. The method of claim 7, further comprising:
   inserting maintenance bits into frames to balance ones and zeroes transmitted on the link;
   wherein the seed value is selected to have a threshold hamming distance from the maintenance bits.

9. The method of claim 7, further comprising:
   generating correction bits for the data frame that includes the unscrambled pseudo-random sequence; and
   attaching the correction bits to the data block that includes the data frame;
   wherein the seed value is selected to produce a minimal threshold of disparity of total ones and zeroes between the unscrambled pseudo-random sequence and the correction bits.

10. The method of claim 9, wherein:
    the generation of correction bits is based on a Bose-Chaudhuri-Hocquenghem (BCH) encoding algorithm.

11. The method of claim 7, wherein:
    the generating of the unscrambled pseudo-random sequence is performed with a linear feedback shift register.

12. The method of claim 7, further comprising:
    preparing first block types that include a header that indicates inclusion of control bits and a frame that includes scrambled primitives of the Serial Attached Small Computer System Interface architecture and unscrambled link maintenance bits; and
    preparing second block types that include a header that indicates inclusion of control bits and a frame that includes the unscrambled pseudo-random sequence; wherein
    the seed value is selected to produce a threshold hamming distance between the unscrambled pseudo-random sequence and the unscrambled link maintenance bits to distinguish the first block types from the second block types.

13. A system comprising:

a transmitter device configured to scramble data with a scrambler, to insert the scrambled data into data frames of data blocks, and to transmit the data blocks over a link; and a receiver device configured to receive the data blocks over the link, to detect the scrambled data in the data frames of the data blocks, and to descramble the scrambled data with a descrambler;

the transmitter device further configured to transmit a data block that includes an unscrambled pseudo-random sequence in a data frame instead of the scrambled data at a predefined periodic interval, and to initialize the scrambler based on transmission of the unscrambled pseudo-random sequence;

the receiver device further configured to receive the data block over the link, to detect the unscrambled pseudo-random sequence in the data frame of the data block, and to initialize the descrambler based on the periodic transmission of the unscrambled pseudo-random sequence the transmitter device further configured to generate the unscrambled pseudo-random sequence based on a seed value selected so that a first portion of the unscrambled pseudo-random sequence represents a header of the data block that indicates that the data frame includes a second portion of the unscrambled pseudo-random sequence.

14. The system of claim 13, wherein:
the transmitter device generates the unscrambled pseudo-random sequence with a linear feedback shift register; and
the receiver device detects the unscrambled pseudo-random sequence with a linear feedback shift register.

15. The system of claim 13, wherein:
the data blocks include a 2-bit header, a 128-bit frame, and a 16-bit forward error correction field.

16. The system of claim 15, wherein:
the unscrambled pseudo-random sequence is a 128-bit value that is generated with a linear feedback shift register based on a 7-bit seed value input.

17. The system of claim 16, wherein:
the last bit of the unscrambled pseudo-random sequence is cleared to zero to maintain balance of ones and zeroes.

18. The system of claim 13, wherein:
the scrambler generates a sequence and the initialization of the scrambler restarts the sequence; and
the descrambler generates a corresponding sequence and the initialization of the descrambler restarts the corresponding sequence.

19. The system of claim 13, wherein:
the transmitter device and the receiver device are compliant with the Serial Attached Small Computer System Interface protocol.

20. The system of claim 13, wherein:
the transmitter device and the receiver device communicate over a serial link.

* * * * *